United States Patent [19]

Blosser

[11] Patent Number: 4,925,008

[45] Date of Patent: May 15, 1990

[54] CONVEYOR BELT CLEANER AND METHOD FOR CLEANING A CONVEYOR BELT

[75] Inventor: Charles H. Blosser, Junction City, Ohio

[73] Assignee: Peabody Coal Company, St. Louis, Mo.

[21] Appl. No.: 275,963

[22] Filed: Nov. 25, 1988

[51] Int. Cl.$^5$ .............................................. B65G 45/00
[52] U.S. Cl. ...................................... 198/497; 198/499
[58] Field of Search ...................... 198/497, 499, 635; 15/256.5, 256.51, 256.52, 256.6

[56] References Cited

U.S. PATENT DOCUMENTS

| | | | |
|---|---|---|---|
| 2,117,032 | 5/1938 | Lodding | 15/256.51 |
| 3,014,833 | 12/1961 | Lee | 15/256.51 |
| 3,202,260 | 8/1965 | Wolf | 198/635 X |
| 3,992,091 | 11/1976 | Fisher | 15/256.51 X |
| 4,152,067 | 5/1979 | Kubota | 15/256.51 X |
| 4,417,365 | 11/1983 | Murasaki | 15/256.51 |
| 4,658,949 | 4/1987 | Reicks | 198/497 |
| 4,768,645 | 9/1988 | Farris | 15/256.5 X |

FOREIGN PATENT DOCUMENTS 1489164 7/1967 France .................. 198/499

Primary Examiner—Robert J. Spar
Assistant Examiner—Cheryl L. Gastineau
Attorney, Agent, or Firm—Senniger, Powers, Leavitt and Roedel

[57] ABSTRACT

A conveyor belt cleaner adapted for use with a conveyor for product such as broken-up coal. The conveyor comprises a frame, an endless belt, and a generally horizontal roller on the frame and at the discharge end of the conveyor guiding the belt for travel in a forward-moving upper reach and a return reach for conveying product on the upper reach to a discharge end thereof. The belt travels around the roller from the upper to the return reach. The cleaner is adapted for cleaning the outer surface of the belt of particles of product which may otherwise cling to the belt and be carried around thereon past the roller. It comprises a member extending generally horizontally adjacent the portion of the belt travelling around the roller adapted for supporting a mass of particles of product in wiping contact with said portion. The member is spaced from said portion so that the sole contact with said portion is that of the mass of particles. The mass of particles on the member conforms to the contour of said portion. Particles coming down and around the roller on the outer surface of the belt are trapped by the mass and the mass is packed against said portion for wiping the surface. The method of cleaning a conveyor belt with the cleaner is also disclosed.

9 Claims, 1 Drawing Sheet

CONVEYOR BELT CLEANER AND METHOD FOR CLEANING A CONVEYOR BELT

BACKGROUND OF THE INVENTION

This invention relates generally to conveyor belts, and in particular to a conveyor belt cleaner and method for cleaning a conveyor belt.

Endless belt conveyors are commonly used for moving materials such as coal, coke, and limestone from one location to another. When the materials are discharged from the conveyor, a small amount of dust and residual particulate matter usually clings to the surface of the belt and accumulates on carrying rollers on the return side of the belt. The accumulation produces float dust which is a major health and safety problem especially in underground mines. It has been known to position various doctor blades or scraper blades in direct contact with the belt to remove the dust and particulate. A disadvantage of such blades is they tend to wear unevenly, thus permitting residual particulate matter to pass by the blade without being dislodged from the belt. Another disadvantage of such blades is they do not remove the residual matter from irregularities, such as grooves or crevices, in the belt. Another disadvantage is that splices on the belt frequently catch on such blades and either damage the blades or are torn, thereby damaging the belt.

SUMMARY OF THE INVENTION

Among the objects of the present invention may be noted the provision of a conveyor belt cleaner which uniformly cleans the surface of a conveyor belt; the provision of such a cleaner which does not wear unevenly; the provision of such a cleaner which removes residual matter from irregularities in the belt; the provision of such a cleaner which accommodates protrusions such as splices on the belt; and the provision of such a cleaner which has a minimum of parts and which is of relatively simple and inexpensive construction.

Generally, the conveyor belt cleaner of the present invention is adapted for use with a conveyor for product such as broken-up coal. The conveyor comprises a frame, an endless belt, and means on the frame guiding the belt for travel in a forward-moving upper reach and a return reach for conveying product on the upper reach to a discharge end thereof. The guiding means includes a generally horizontal roller at the discharge end around which the belt travels from the upper to the return reach. The conveyor belt cleaner is adapted for cleaning the outer surface of the belt of particles of product which may otherwise cling to the outer surface of the belt and be carried around thereon past the roller. It comprises a member extending generally horizontally adjacent the outer surface of the portion of the belt travelling around the roller adapted for supporting a mass of particles of product in wiping contact with the outer surface of the portion of the belt travelling around the roller. The member has an upwardly facing surface for supporting the mass of particles and an edge adjacent to but spaced from the outer surface of the portion of the belt so that the sole contact with the outer surface of the portion of the belt is that of the mass of particles. The mass of particles on the member conforms to the contour of the outer surface of the portion of the belt. Particles coming down and around the roller on the outer surface of the belt are trapped by the mass and the mass is packed against the outer surface of the portion of the belt for wiping the surface.

In general, according to the method of the present invention, the outer surface of an endless belt of a conveyor is cleaned, the belt having a forward-moving upper reach carrying a Product such as broken-up coal to a discharge end thereof and a return reach. The belt travels down and around a generally horizontal roller at the discharge end from the upper to the return reach. The method comprises supporting a mass of particles of product in wiping contact with the outer surface of the portion of the belt travelling around the roller, the mass constituting the sole contact with the surface and conforming to the contour of the surface. Particles coming down and around the roller on the outer surface of the belt are trapped by the mass which is packed against the outer surface of the portion of the belt for wiping the surface.

These and other advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
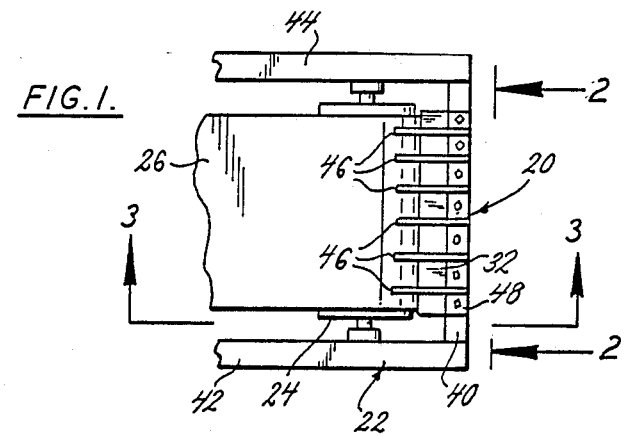
FIG. 1 is a plan of a conveyor belt cleaner of the present invention attached to the frame of a conveyor.
Figure 2:
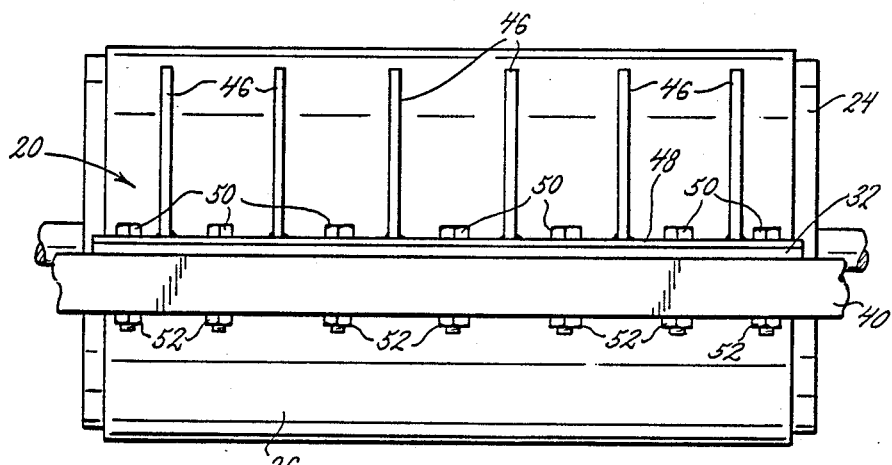
FIG. 2 is a rear elevation.
Figure 3:
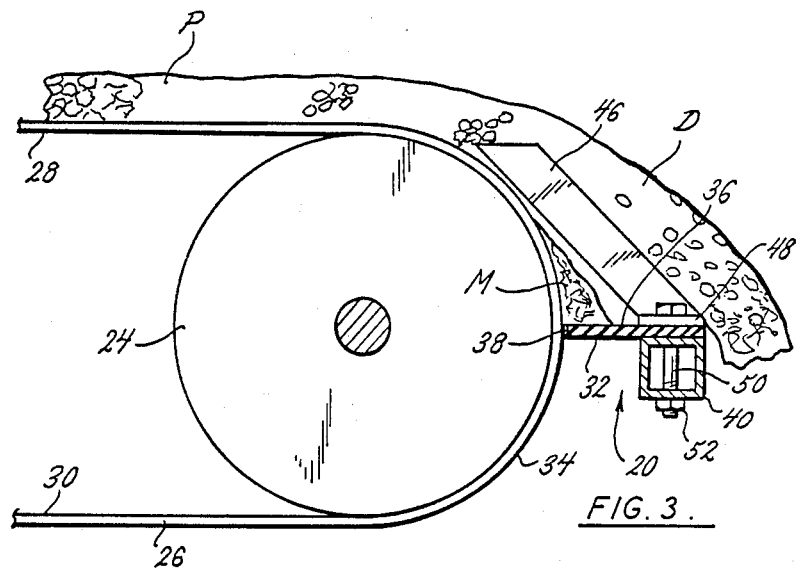
FIG. 3 is a side elevation.

A conveyor belt cleaner constructed according to the principles of this invention, indicated generally at 20, is shown in FIGS. 1–3 attached to the frame 22 of a conveyor. The conveyor is of the type which transports product (indicated generally at P) such as broken-up coal and comprises a frame 22, a generally horizontal roller 24 (or head drum) on the frame 22, and an endless belt 26 guided by the roller 24. The roller 24 guides the belt for travel in a forward-moving upper reach 28 and a lower return reach 30 for conveying product P on the upper reach 28 to a discharge end. The conveyor belt cleaner 20 is adapted for cleaning the outer surface of belt 26 of particles of product P which may otherwise cling to the outer surface of belt 26 and be carried around on the outer surface and past the roller 24.

In general, the conveyor belt cleaner 20 comprises a member or strip 32 extending generally horizontally adjacent the outer surface of the portion 34 of belt 26 travelling down and around the roller 24. The strip 32 is adapted for supporting a mass of particles of the product in wiping contact with the outer surface of portion 34, this mass being indicated at M. The strip 32 has an upwardly facing surface 36 for supporting the mass of particles and an edge 38 adjacent to but spaced from the outer surface of portion 34 of the belt. The edge 38 is spaced from the outer surface of portion 34 so that the sole contact with the outer surface of portion 34 is that of the mass M of particles. The mass M conforms to the contour of the outer surface of portion 34. Particles coming down and around roller 24 are trapped by the mass and the mass is packed against the outer surface of portion 34 for wiping the surface.

A square tube 40 for supporting the cleaner 20 is positioned at the discharge end of the conveyor, its ends being secured to side beams 42, 44 of the frame 22. Strip 32 extends from tube 40 toward the outer surface of portion 34 of the belt. Preferably, strip 32 is made of an elastomeric material such as polyurethane so that the strip will yield when contacted by any substantial imperfection, such as a splice, in the belt 26 yet be sufficiently rigid to support the mass of Particles in wiping relation against the surface of portion 34.

A plurality of deflecting bars 46 extend from tube 40 toward the discharge end of upper reach 28 and over strip 32 for deflecting particles of discharged product onto the upwardly facing surface 36 of strip 32. The bars 46 are fixed to an elongate flat plate 48 which has a downwardly facing surface abutting the upwardly facing surface 36 of strip 32. Strip 32 is sandwiched between plate 48 and tube 40. Strip 32 and plate 48 are secured to tube 40 by a Plurality of bolts 50 and nuts 52. The particles of discharged product which are deflected to strip 32 by deflecting bars 46 form the mass of particles which wipe against the surface of portion 34.

OPERATION

The upper reach 28 of belt 26 travels in a forward moving direction toward the roller 24 and toward the discharge end. Product P such as broken-up coal is transported on the upper reach 28 of the belt to the discharge end where it is then discharged to a desired location. Deflecting bars 46 extend into the discharge stream D of the product to deflect particles of the discharged product onto surface 36 of strip 32. The compilation of deflected product P onto strip 32 forms the mass M of particles, the mass being packed against and conforming to the contour of the outer surface of portion 34 of the belt. Residual particles of product, which cling to belt 26 and are not discharged from the conveyor, travel on belt 26 around roller 24 and are wiped from the outer surface of belt 26 by mass M. The mass M also conforms to the contour of irregularities such as grooves and valleys in belt 26 to wipe residual particles therefrom. Thus, cleaner 20 removes residual particles from irregularities and uniformly cleans the surface of belt 24.

The wiped residual particles are added to mass M and thereby cause it to increase. As mass M increases, excess particles fall off the rear of strip 32 and into the discharge stream D. Thus, belt 26 is continually wiped by mass M.

Also, edge 38 of strip 32 is spaced a short distance away from the surface of belt 26 so that strip 32 is not rubbed and worn by belt 26. Since strip 32 is not contacted by belt 34 it does not wear out and its life is not diminished during normal operation of the conveyor. Since its effectiveness is not dependent on its contact with belt 26 its effectiveness is not diminished with age.

Additionally, the resiliency of strip 32 permits it to bend when contacted by Protrusions such as splices on belt 26 rather than damaging the belt or being damaged by the belt. However, after strip 32 is bent by such protrusions it rebounds back to its normal horizontal position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A conveyor belt cleaner adapted for use with a conveyor for product such as broken-up coal comprising a frame, an endless belt, and means on the frame guiding the belt for travel in a forward-moving upper reach and a return reach for conveying product on the upper reach to a discharge end thereof, the guiding means including a generally horizontal roller at the discharge end around which the belt travels from the upper to the return reach, the conveyor belt cleaner adapted for cleaning the outer surface of the belt of particles of product which may otherwise cling to the outer surface of the belt and be carried around thereon past the roller, the conveyor belt cleaner comprising a member extending generally horizontally adjacent the outer surface of the portion of the belt travelling around the roller for supporting a mass of particles of product in wiping contact with the outer surface of the portion of the belt travelling around the roller, the member having an upwardly facing surface for supporting the mass of particles and an edge adjacent to but spaced at all times from the outer surface of the portion of the belt traveling around the roller so that the sole contact with the outer surface of the portion of the belt is that of the mass of particles, the mass of particles conforming to the contour of the outer surface of the portion of the belt, particles coming down and around the roller on the outer surface of the belt being trapped by the mass and the mass being packed against the outer surface of the portion of the belt for wiping the surface.

2. A conveyor belt cleaner as set forth in claim 1 further comprising means carried by the frame extending over the member and adjacent the discharge end of the upper reach of the belt for deflecting particles of the product to the upwardly facing surface of the member.

3. A conveyor belt cleaner as set forth in claim 2 wherein the deflecting means comprises a plurality of bars extending from the frame toward the discharge end of the upper reach to deflect a portion of the discharged product to the upwardly facing surface of the member.

4. A conveyor belt cleaner as set forth in claim 1 wherein the member is an elongate elastomeric strip.

5. A conveyor for product such as broken-up coal comprising a frame, an endless belt, means on the frame guiding the belt for travel in a forward-moving upper reach and a return reach for conveying product on the upper reach to a discharge end thereof, the guiding means including a generally horizontal roller at the discharge end around which the belt travels from the upper to the return reach, and characterized in having at the discharge end means for cleaning the outer surface of the belt of particles of product which may otherwise cling to the outer surface of the belt and be carried around thereon past the roller, the cleaning means comprising a member extending generally horizontally adjacent the outer surface of the portion of the belt travelling around the roller for supporting a mass of particles of product in wiping contact with the outer surface of the portion of the belt travelling around the roller, the member having an upwardly facing surface for supporting the mass of particles and an edge adjacent to but spaced at all times from the outer surface of the portion of the belt travelling around the roller so that the sole contact with the outer surface of the portion of the belt is that of the mass of particles, the mass of particles conforming to the contour of the outer surface of the portion of the belt, particles coming down and around the roller on the outer surface of the belt being trapped by the mass and the mass being packed against the outer surface of the portion of the belt for wiping the surface.

6. A conveyor as set forth in claim 5 further comprising means carried by the frame extending over the member and adjacent the discharge end of the upper reach of the belt for deflecting particles of the product to the upwardly facing surface of the member.

7. A conveyor as set forth in claim 6 wherein the deflecting means comprises a plurality of bars extending from the frame toward the discharge end of the upper reach to deflect a portion of the discharged product to the upwardly facing surface of the member 8. A conveyor as set forth in claim 5 wherein the member is an elongate elastomeric strip.

9. A method of cleaning the outer surface of an endless belt of a conveyor having a forward-moving upper reach carrying a product such as broken-up coal to a discharge end thereof and a return reach, the belt travelling down and around a generally horizontal roller at the discharge end from the upper to the return reach, the method comprising supporting a mass of particles of product in wiping contact with the outer surface of the portion of the belt travelling around the roller, the mass of product constituting the sole contact with the surface substantially at all times, the mass of particles conforming to the contour of the surface, particles coming down and around the roller on the outer surface of the belt being trapped by the mass and the mass being packed against the outer surface of the portion of the belt for wiping the surface.

* * * * *